UNITED STATES PATENT OFFICE.

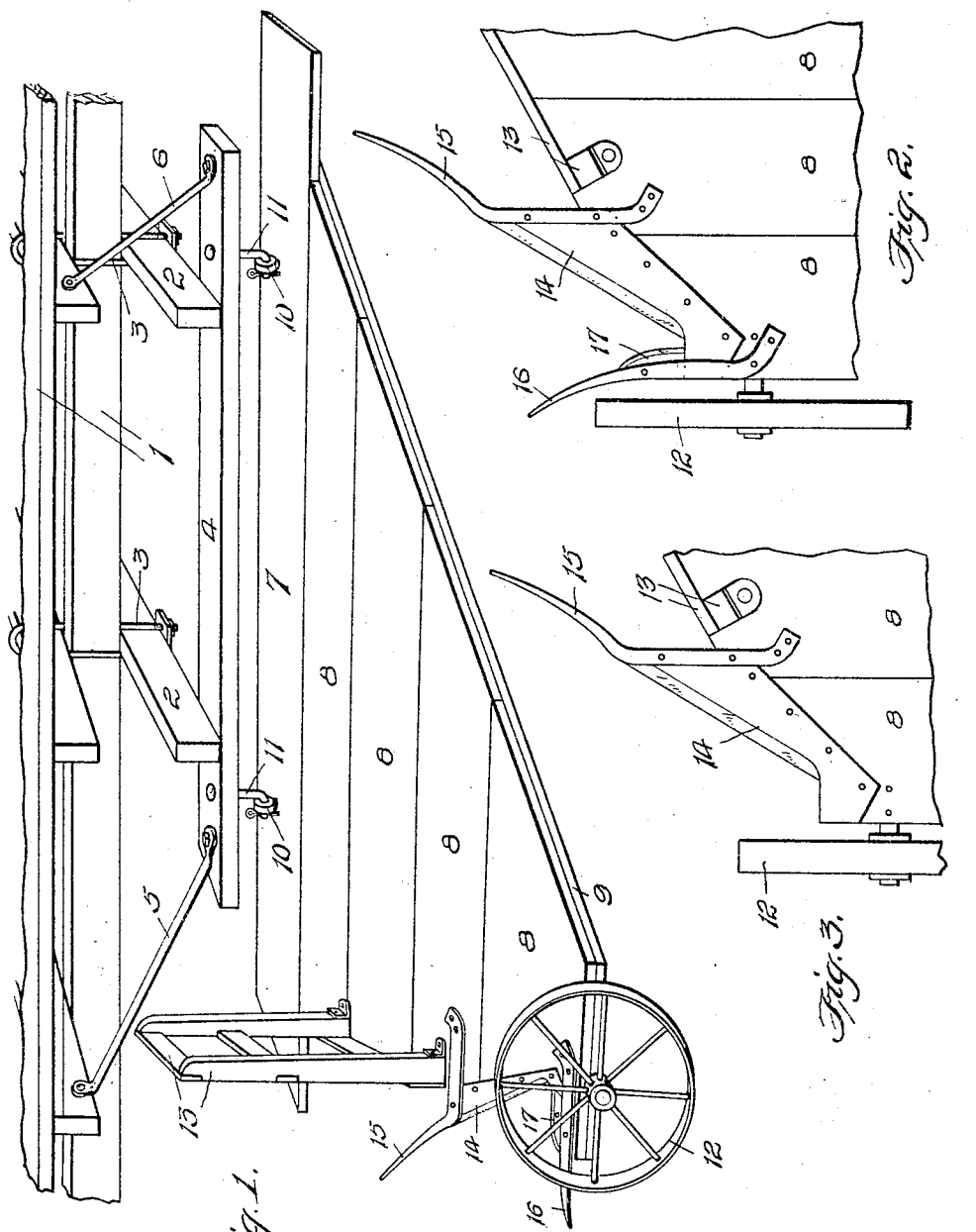

GUSTAV M. HUENEFELD, OF NEW FLORENCE, MISSOURI.

CORNSTALK-CUTTING ATTACHMENT FOR VEHICLES.

1,287,321. Specification of Letters Patent. Patented Dec. 10, 1918.

Application filed November 26, 1917. Serial No. 204,049.

*To all whom it may concern:*

Be it known that I, GUSTAV M. HUENEFELD, a citizen of the United States, residing at New Florence, in the county of Montgomery and State of Missouri, have invented certain new and useful Improvements in Cornstalk-Cutting Attachments for Vehicles, of which the following is a specification.

My invention relates to corn stalks cutting attachments for vehicles and has for its object to improve the construction of this class of devices.

With the above and other objects in view which will appear hereinafter, the invention consists in the novel construction, arrangements and combination of parts fully described in the following specification, illustrated in the accompanying drawings and finally pointed out in the claims hereto appended.

Referring to the drawings forming a part of this specification wherein like characters of reference denote similar parts throughout the several views:

Figure 1, is a perspective view of a corn stalk cutter constructed and attached to a hay wagon frame in accordance with my invention.

Fig. 2, is a top plan view of the corn stalk cutter with portions thereof broken away.

Fig. 3, is a modified form of the device with portions thereof broken away.

Referring to the drawings the reference character 1 designates an ordinary hay-wagon frame.

In carrying out the aim of my present invention, I provide the underside of the frame 1 with two transverse members or cross pieces 2 held in a fixed position by means of suitable fasteners 3. These cross pieces 2 each project beyond one side of the frame 1, as shown in Fig. 1. A supporting member 4 is suitably fixed to the underface of each cross piece 2 near the outer ends thereof. A pair of suitable brace-rods 5 and 6 are fixed at their lower ends to the supporting member 4. The upper ends of the brace-rods 5 and 6 are suitably fixed to upper cross-pieces of the frame 1.

A cutter platform proper is employed which consists of a running-board 7 and a plurality of platform boards 8. The platform boards gradually grow shorter in length toward the outside platform board member. The board members 7 and 8 are suitably secured upon a suitable under frame 9.

The running board member 7, of the platform, is provided with a pair of suitable I-bolts 10 which are engaged by means of a pair of hooked bolts 11 carried by the supporting member 4. This arrangement provides a removable hinge connection between the running board member 7, of a platform, and the supporting member 4 carried by the cross-pieces 2, of the wagon frame 1.

The outer side of the platform near its forward end is provided with a suitable supporting wheel 12, of any desired diameter, as clearly shown in Fig. 1.

The forward end of the platform is provided with a suitable hand-rail and guard 13 to protect the party working upon the platform from getting in contact with the cutting means carried by the platform while performing his duties of removing corn stalks from the platform and depositing them upon the wagon-frame 1.

The means for cutting and gathering the corn stalks, as the device is drawn down a row of corn, consists of a suitable knife blade 14, suitably fixed to the platform near the forward and outer corner thereof and adjacent the platform supporting wheel 12. This knife blade 14 is preferably set at an angle of about 60 degrees and the head thereof is provided with a suitable guard or arm 15 adapted to gather and crowd corn stalks in toward the knife blade 14 to be severed thereby. As the stalks are severed they are held by an operator upon the platform in an upright position until an armful has been severed and collected, then the operator deposits same upon the wagon-frame 1 while a second operator is collecting an armful of stalks. Two parties may conveniently work upon the platform.

A second guard 16 may also be employed, if desired, and positioned at the opposite end of the knife blade 14. Guard 16, as well as guard 15 are suitably fixed to the platform members 7.

A second or auxiliary knife blade 17, may also be employed and when employed is positioned adjacent the inner edge of the guard 16, as clearly shown in Figs. 1 and 2.

The modified form of cutting means shown in Fig. 3, is exactly like the means shown in Figs. 1 and 2, excepting that in the modified form, I have eliminated the use of the guard 16 and the auxiliary knife blade 17.

The operation of the stalk-cutter is as follows:

The device is attached to a wagon-frame or rack as hereinbefore described, and is moved along a row of corn stalks, severing them a suitable distance from the ground. The stalks, it will be observed are gathering in by the guards 15 and 16, where both are employed, and crowded toward the knife blades to be severed thereby as is manifest. When the stalks have been severed they are held in an upright position upon the platform back of the knife 14 until an armful has been severed, then the party or parties riding on the platform deposit their armful upon the rack or frame 1, which, of course is wheel supported for moving the cutter attachment in the field. When a load of stalks have been severed and deposited upon the frame 1, the cutter attachment may be detached, by removing the hooked bolts from the eye-bolts of the running board member 7, thereby permitting the load of stalks to be taken to a silo or elsewhere. When the vehicle returns to the field the cutting device may again be easily attached.

The running-board 7, of the platform, it will be observed, is somewhat longer than the platform members 8, thereby enabling the operator to walk front or rear of the frame 1 and deposit stalks at the extreme forward end of the frame 1, as well as to the extreme rearward end thereof.

It will be observed from the foregoing description that I do not permit any of the severed stalks to fall upon the platform, and that the operator holds same in an upright position to the rear of the cutting means until an armful has been severed. This is where time and labor is saved as two men can work upon the platform at the same time, and while one is depositing an armfull of stalks upon the wagon-frame, the other party can be collecting and holding the stalks that are being continuously severed as the device is being drawn down a row. The horses pulling the vehicle and its cutting attachment can keep up a slow-walk until a full load of stalks have been severed.

The many advantages of the herein described device will readily suggest themselves to those skilled in the art to which it appears.

The device as herein described is simple and comparatively cheap in construction, practical, durable and highly efficient for the purposes intended.

I am aware that minor changes in the details of construction may be made by persons skilled in the art to which it relates, hence I reserve the right to make any such changes or modifications, as may fairly fall within the scope of the appended claims, when fairly construed.

What I claim is:

1. In combination with a wagon-frame, a support, a platform, a running-board secured thereto at its inner side, hinge connections between the running-board and said support, a supporting-wheel for said platform, and cutting means secured to the platform near the outer forward corner thereof and at a suitable angle to the front edge of the platform.

2. In combination with a wagon-frame, a support, a platform movably supported from said support, a supporting wheel for said platform, cutting means carried by said platform, gathering means extending forwardly from said cutting means, and a guard-rail fixed to said platform adjacent said cutting means.

3. In combination with a wagon-frame, a support carried by the wagon-frame, a platform, a running board forming a part of said platform, means for hingedly connecting the platform to said support, a wheel for supporting one edge of said platform cutting means secured to the front end of said platform near its outer forward corner, gathering means adjacent the cutting means and extending forwardly and outwardly therefrom, and a guard-rail fixed to the forward end of said platform adjacent said cutting means.

4. In combination with a wagon-frame, a support, a platform, a running board secured thereto, hinged connections between said platform and said supporting rail, a wheel support for said platform, a knife secured to the forward end of said platform near the outer forward corner thereof, an auxiliary-knife, gathering means extending forwardly from said knives, and a guard-rail secured to the forward end of said platform as a protection from said knives.

5. In combination with a wagon-frame, a pair of cross-pieces secured to the underside of said wagon-frame, a cross-piece uniting the outer ends of said cross-pieces, bracing means, a platform, a running-board forming a part of said platform, hook and eye means for supporting the inner side of said platform, a wheel support for the outer edge of said platform, cutting means, gathering means, and a guard-rail as a protection from said cutting means.

In testimony whereof, I have hereunto signed my name to the specification.

GUSTAV M. HUENEFELD.